Aug. 15, 1967
T. E. PAULSON ETAL
3,336,527
SPINNING PROBE INSPECTION DEVICE INCLUDING RETRACTION
MEANS DISABLED BY CENTRIFUGAL FORCE
Filed May 3, 1965
3 Sheets-Sheet 2
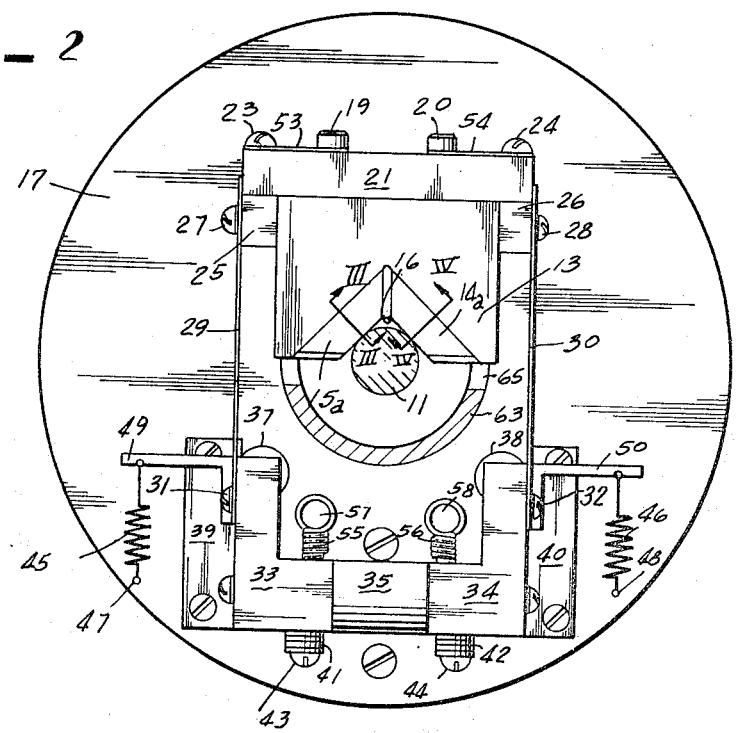
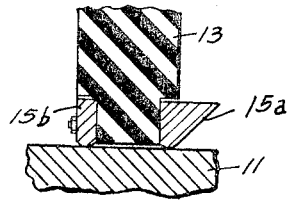
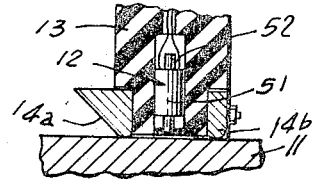
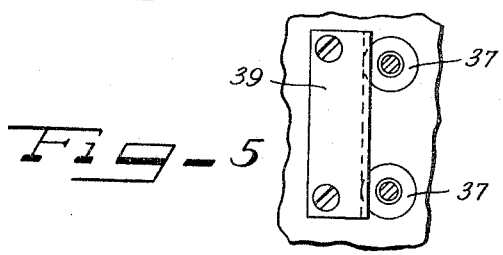
INVENTOR.
THOMAS E. PAULSON
HERBERT E. LIEBSCH
PETER J. ROSAUER
ATTORNEYS

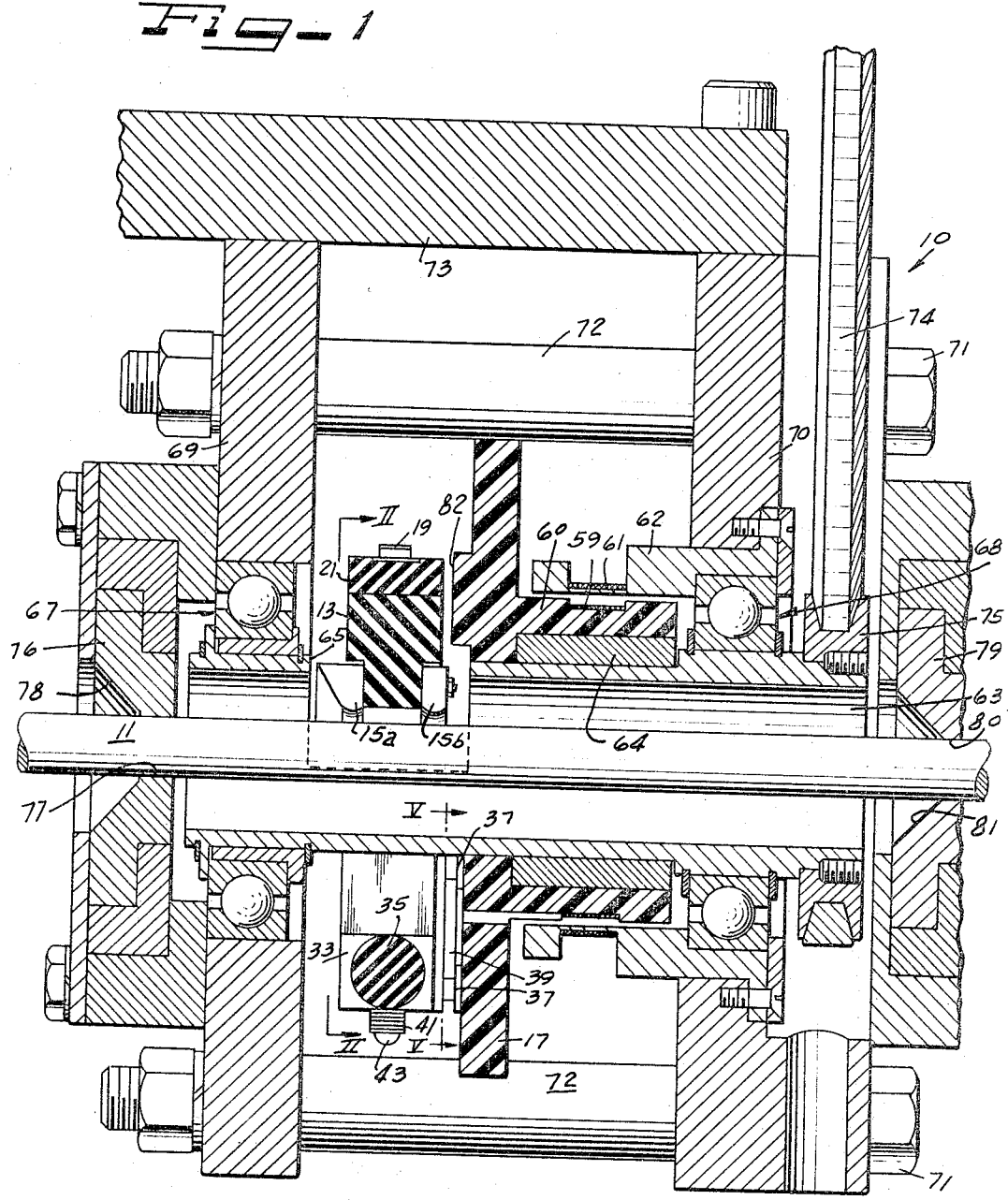

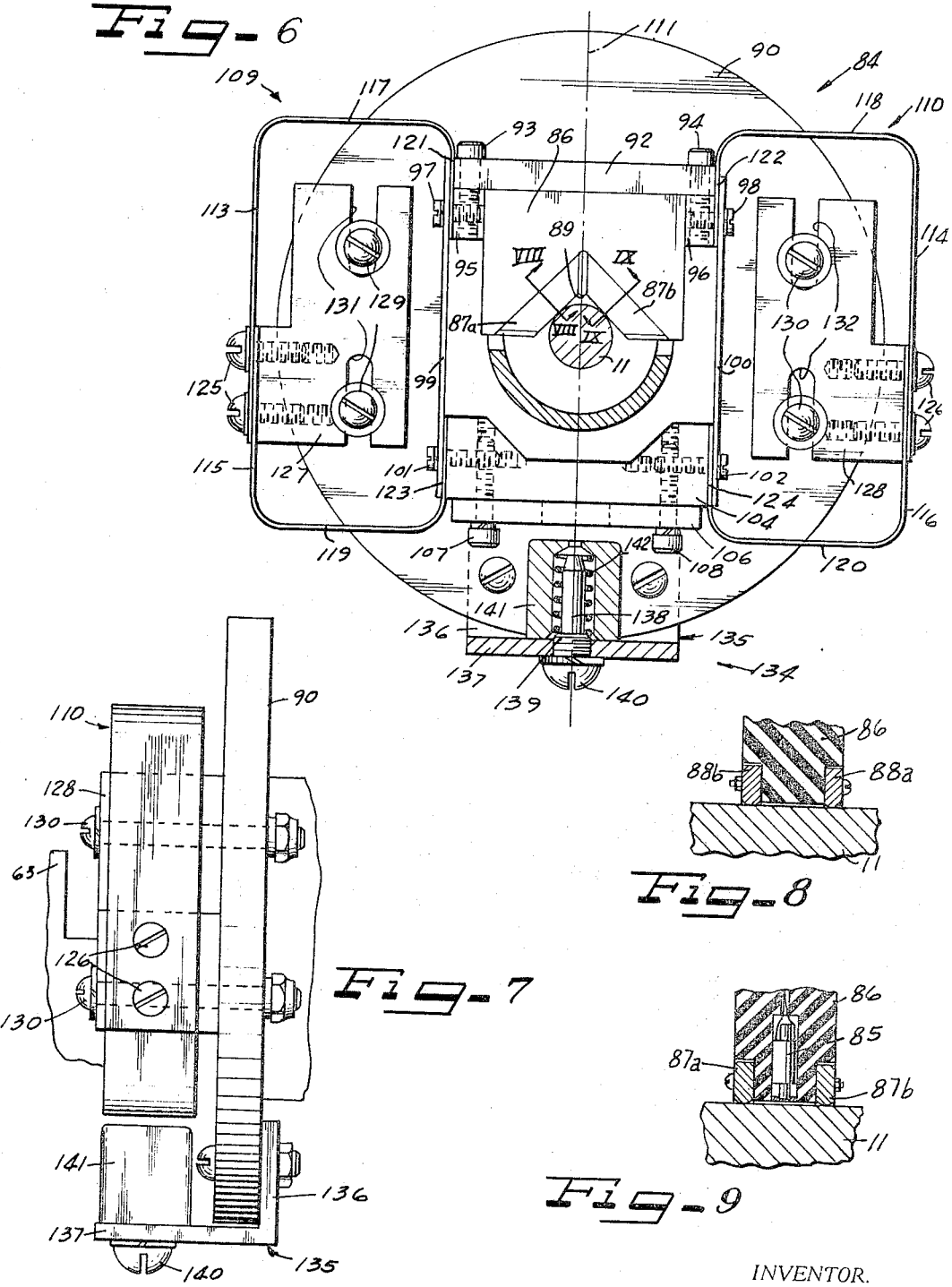

United States Patent Office 3,336,527
Patented Aug. 15, 1967

3,336,527
SPINNING PROBE INSPECTION DEVICE INCLUDING RETRACTION MEANS DISABLED BY CENTRIFUGAL FORCE
Thomas E. Paulson, Glenview, Herbert E. Liebsch, Niles, and Peter J. Rosauer, Mount Prospect, Ill., assignors to Magnaflux Corporation, Chicago, Ill., a corporation of Delaware
Filed May 3, 1965, Ser. No. 452,689
6 Claims. (Cl. 324—40)

This invention relates to a spinning probe unit for testing elongated cylindrical objects and more particularly to a unit which is compact and relatively simple in construction and operation but which produces very uniform and accurate results, which permits the object to be readily inserted in position for testing and which is otherwise easily operated.

It is known in the art that elongated cylindrical objects may be inspected by engaging an eddy current probe with the outer surface of the object and rotating the probe about the axis of the object, so as to permit substantially the entire surface of the object to be inspected by moving the object axially. In one known type of apparatus, a probe assembly includes a pair of eddy current probes spaced for engagement with surface portions of the object which have an angular spacing on the order of ninety degrees. A sub-assembly of such probes is mounted from a second sub-assembly by means of a pair of parallel leaf springs, and the second sub-assembly, in turn, is supported from a rotatable support by a second pair of leaf springs which are located generally at right angles to the first pair of leaf springs. With this arrangement, a flexible mounting is provided which permits continuous engagement of the probes with the surface of the object, even though the axis of the object may be offset to some extent with respect to the axis of rotation of the rotating support. In the known type of apparatus, the weight distribution is such that the sensing head is moved radially in response to centrifugal force, and the second pair of leaf springs are arranged to urge the probes away from the object in the absence of centrifugal force. This arrangement has an advantage in that with the assembly being in a non-rotative condition, the object can be readily inserted in position, after which the support may be rotated to cause centrifugal force to move the sensing head to urge the probes into engagement with the object.

Apparatus so constructed has advantages over other types of apparatus which may be used for testing elongated cylindrical objects, but still leaves something to be desired. In particular, it is found that with the use of two pairs of leaf springs, the mounting of the probes is so flexible as to allow substantial vibratory action, and to cause non-uniformities in the test results. Further, it is found that with the sensing head being moved radially in response to centrifugal force, sharp impacts between the probes and the object may result to cause damage, and also the test results are not uniform.

According to an important feature of this invention, probe means are provided having portions on opposite sides of the axis of a cylindrical object which is tested, such as to provide a substantial balance with respect to centrifugal forces acting thereon, and spring means are provided for urging a sensing face portion of the probe means toward the axis of the object. Thus, the probe means are not moved radially in response to centrifugal force.

It is found that this feature produces improved results. The pressure between the sensing face portion is determined solely by the spring means, since the probe means is otherwise balanced with respect to centrifugal forces, so that the pressure is uniform and is not affected by centrifugal force.

Another feature of the invention is in the provision of means for retracting the sensing face portion to permit the object to be inserted into position while allowing the sensing face portion to be brought smoothly into contact with the outside surface of the cylindrical object, without any abrupt contact, or impact, between the sensing face portion and the surface of the object, such as is apparently obtained when a sensing head is moved radially in response to centrifugal force.

In one preferred embodiment of the invention, cam face means are provided on the probe means adjacent to the sensing face portion for engagement with the end of the cylindrical object to cam the sensing face portion away from the axis against the force of the spring means, so as to allow the cylindrical object to be readily positioned in the apparatus.

In another preferred embodiment of the invention, separate control means are provided operable by spring means to engage the probe means and move the sensing face away from the object, while weight means associated with the separate control means are operable in response to centrifugal force to move the separate control means out of engagement with the probe means.

A further feature of the invention is in the support of a first sub-assembly including a probe from a second sub-assembly through leaf spring members, in a manner similar to the arrangement of the prior apparatus discussed above, but with the second sub-assembly being guided for rectilinear movement, preferably by means of pairs of opposed rollers, in a manner to reduce the flexibility of the mounting and the vibration otherwise produced, while at the same time obtaining uniform engagement of the probe, and while accommodating an offset relationship between the axis of the object and the axis of rotation of the probe support member.

A specific feature of the invention is in the provision of a pair of springs operating in a symmetrical and balanced fashion on the second sub-assembly referred to above, to urge the probe means toward the surface of the object.

Still another feature of the invention is in the provision of a resilient support for the probe means in the form of a pair of symmetrically located leaf spring means, operative to provide resiliency in the required directions, while otherwise providing firm support for the probe means.

This invention contemplates other and more specific objects, features and advantages which will become more fully apparent from the following detailed description taken in conjunction wtih the accompanying drawings which illustrate a preferred embodiment and in which:

FIGURE 1 is an elevational sectional view through a spinning probe unit constructed according to the principles of this invention;

FIGURE 2 is a sectional view taken substantially along line II—II of FIGURE 1;

FIGURES 3 and 4 are sectional views taken along lines III—III and IV—IV of FGURE 2.

FIGURE 5 is a sectional view taken substantially along line V—V of FIGURE 1;

FIGURE 6 is a sectional view similar to FIGURE 2, but illustrating a modified construction;

FIGURE 7 is a side elevational view of the modifications of FIGURE 6; and

FIGURES 8 and 9 are sectional views taken substantially along lines VIII—VIII and IX—IX of FIGURE 5.

Reference numeral 10 generally designates one form of spinning probe unit constructed according to the principles of this invention. The unit 10 is illustrated in use in testing an elongated cylindrical object in the form of a wire 11, but it will be understood that the unit can be used in testing other elongated cylindrical objects such as rods or tubes.

In general, the unit 10 comprises an eddy current probe 12 which as shown in the sectional view of FIGURE 4 is mounted in a block 13, between a pair of wear shoes 14a and 14b which have rounded surfaces engaged with the surface of the wire 11. The axis of the probe should preferably be perpendicular to the engaged surface portion of the wire, so that a projection of the probe axis would intersect the axis of the wire, and to obtain such a relationship, a second pair of wear shoes 15a and 15b mounted on the block 13 at a position such as to engage points on the surface of the wire spaced approximately ninety degrees from the points engaged by the wear shoes 14a and 14b. As shown in FIGURE 2, the wear shoes are mounted in a generally V-shaped recess or cutout 16 of the block 13, with the midpoint of each wear shoe being spaced from the opposite face of the cutout 16 by distance of half the diameter of the wire being tested so that the midpoints of wear shoes 14a and 14b engage the wire 11 at points spaced ninety degrees from the points engaged by wear shoes 15a and 15b. The wear shoes may preferably be cemented carbide members with studs being brazed to the shoes 14a and 15a to extend through portions of the block 13 and through the shoes 14b and 15b to received nuts to hold the shoes in assembly.

As described below, the block 13 is urged toward the axis of the wire 11 and is supported from a circular support member 17 which is rotated about the axis of the wire 11, thereby spinning the probe 12 about the axis of the wire 11. With the wire being moved axially through the unit, by means not shown, substantially the entire surface of the wire may be scanned.

As shown in FIGURE 2, the block 13 is secured by screws 19 and 20 to a bar 21 which, in turn, is secured by screws 23 and 24 to a pair of blocks 25 and 26. Blocks 25 and 26 are secured by pairs of screws 27 and 28 to ends of a pair of leaf springs or metal strips 29 and 30, the opposite ends of which are secured by pairs of screws 31 and 32 to the outer surfaces of legs of a pair of L-shaped members 33 and 34, the other legs of which are secured together through a spacer member 35. It will be noted that the strips 29 and 30 are parallel to each other and substantially equi-distant from a plane through the axis of rotation of the member 17 and bisecting the angle defined by the faces of the cutout 16. Thus with resilient flexure of the strips 29 and 30, the block 13 is movable in a path generally transverse to the strips 29 and 30.

To allow for movement in a direction transverse to the direction of movement thus allowed by the strips 29 and 30, the L-shaped members 33 and 34 carry pairs of rollers 37 and 38 which are movable in guideways defined by the surface of the member 17 and by plates 39 and 40 which are secured by screws to the member 17.

In accordance with this invention, the probe means, including the sub-assembly defined by block 13, bar 21 and blocks 25 and 26, and including the sub-assembly defined by members 33, 34, 35 and rollers 37 and 38, is substantially balanced with respect to centrifugal forces acting thereon, and spring means are provided for urging the block 13 toward the axis of rotation, so that the pressure between the wear shoes 14a, 14b, 15a and 15b and the wire 11 is determined solely by the force exerted by the spring means, to be substantially independent of centrifugal forces.

In order to obtain the centrifugal balance, all parts may be formed with precisely determined weights and dimensions, but preferably, the sub-assembly including the block 13 may have a weight somewhat less than that required to obtain a centrifugal balance, and sets of washers 41 and 42 may be secured to the members 33 and 34 by screws 43 and 44, washers being added until a centrifugal balance is obtained in practice.

To urge the block 13 toward the wire 11, a pair of tension springs 45 and 46 are connected between posts 47 and 48 secured to the member 17 and brackets 49 and 50 secured to the members 33 and 34 by the screws 31 and 32.

It is noted that the springs 45 and 46 and all other parts of the assembly are symmetrically located with respect to a plane passing through the axis of rotation and bisecting the angle defined by the faces of the cutout 16. With the feature, a maximum freedom of movement is insured, and the wear shoes can be maintained in uniform pressure engagement with the surface of the wire, even when the wire is eccentrically located with its axis offset from the axis of rotation.

According to another important feature of the invention, cam face means are provided for engagement with the end of the wire to cam the block 13 away from the axis of rotation and to allow the wire to be readily inserted in the unit initially. In accordance with this feature, the wear shoes 14a and 15a project axially and have inclined cam faces as shown in FIGURES 3 and 4. With this arrangement, the end of the wire may engage the cam faces of the shoes 14a and 15a to smoothly move the block 13 outwardly as the wire is inserted into the unit and to bring the rounded inner ends of the wear shoes into engagement with the surface of the wire.

The illustrated probe 12 comprises a coil 51 on a core 52 of the magnetic material, the inner end of the core being closely adjacent to the surface of the wire. The terminals of the coil are electrically connected through wires in a passage of the block 13 to terminals, not shown, at the inner ends of the screws 19 and 20, the block 13 and also the bar 21 being of insulating material. Screws 19 and 20 are connected through thin metal plates 53 and 54 to screws 23 and 24 which are electrically connected through the blocks 25 and 26, of metal, to the strips 29 and 30. The L-shaped members 33 and 34 are of metal and are connected through flexible leads 55 and 56 to terminals 57 and 58 carried by the member 17, it being noted that the member 35 is of insulating material. Terminals 57 and 58 are connected to terminals of a coil 59, wound in a groove of an integral sleeve portion 60 of the member 17, and forming a rotating transformer secondary winding which is inductively coupled to a primary winding 61 on a fixed sleeve member 62. The primary winding 61 is connected to suitable eddy current testing instrument.

The member 17 is supported on a sleeve 64 of powdered iron or other magnetic material, forming a core for the transformer being disposed between the outer surface of the sleeve 63 and the inner surface of the integral sleeve portion 60 of the member 17. The sleeve 63 has a cutout 65 therein through which the inner end of the block 13 extends for engagement of the wear shoes 14 and 15 with the surface of the wire 11.

The sleeve 63 is supported through ball bearing assemblies 67 and 68 from walls 69 and 70 secured in spaced parallel relation by means of bolts 71 and spacers 72. A plate 73 is affixed to the walls 69 and 70 and carries an electric motor, not shown, which is mechanically coupled through a V-belt 74 to a pulley 75 on one end of the sleeve 63.

To guide the wire 11 in passage through the unit, a circular plate 76 is provided at the entrance end of the unit, having a central opening 77 coaxial with the axis of rotation of the probe assembly and having an outer bevelled surface 78 to facilitate insertion of the wire 11 into the unit. At the exit end of the unit, a similar plate 79 is provided having a central opening 80 and having an inner bevelled surface 81. The plates 76 and 79 are preferably removable, for replacement by similar plates with different sized openings, so that the unit can be used with wires or other objects of different dimensions. The block 13 may also be removed, and replaced with another block having wear shoes positioned for a wire of a different dimension.

It should be noted that a stop 82 is disposed on the support member 17 and is normally spaced a small distance from the block 13, so as not to interfere with radial movement thereof, but is engageable by the block 13 to limit axial displacement thereof under the influence of forces exerted in the initial insertion of a wire into the unit.

Referring to FIGURES 6–9, reference numeral 84 generally designates a modified construction which is quite similar in most respects to the construction used in unit 10, with a probe 85, shown in the selectional view of FIGURE 9, being mounted in a block 86, between a pair of wear shoes 87a and 87b which are engaged with the surface of the wire 11. A second pair of wear shoes 88a and 88b, similar to the wear shoes 15a and 15b, are mounted in the block 86 at a position such as to engage a point on the surface of the wire spaced approximately ninety degrees from the point engaged by the wear shoes 87a and 87b. The wear shoes are mounted in a generally V-shaped recess or cut-out 89 of the block 86, with the midpoint of each wear shoe being spaced from the opposite face of the cut-out 89 by a distance of half the diameter of the wire being tested, thereby obtaining the above-mentioned ninety-degree relationship.

As described below, the block 86 is urged toward the axis of the wire 11 and is resiliently supported from a circular support member 90, which may be supported in a manner identical to the support of the member 17 of the unit 10, for rotation about the axis of the wire 11 to spin the probe 85 about the axis of the wire 11.

In the modified construction 84, the block 86 is fixedly secured to a bar 92 which, in turn, is secured by screws 93 and 94 to a pair of blocks 95 and 96. Blocks 95 and 96 are secured by screws 97 and 98 to ends of side plates 99 and 100, with the opposite ends of the side plates 99 and 100 being secured by screws 101 and 102 to a bar or block 104. Thus an assembly is provided in generally surrounding relation to the wire 11.

In accordance with this invention, the assembly is balanced with respect to centrifugal forces acting thereon, and for this purpose, a counterweight 106 is secured by screws 107 and 108 to the bar or block 104.

An important feature of the modified construction 84 is in the provision of first and second leaf spring means, generally designated by reference numerals 109 and 110 for supporting the probe assembly from the support member 90. The leaf spring means 109 and 110 are symmetrically located with respect to a plane of symmetry through the axis of the wire, the plane of symmetry being along the vertical line 111 in the position of the parts as illustrated. The plane of symmetry may also bisect the angle of the V-shaped recess or cutout 89, although it is not necessarily required that this be the case.

The leaf spring means 109 and 110 are affixed to the support member 90 at points outside the probe assembly and they include, first, portions 113 and 114, and, second, portions 115 and 116, extending in opposite directions from such points and in parallel relation to the plane of symmetry, with third portions 117 and 118 and fourth portions 119 and 120 extending from the first portions 113 and 114 and the second portions 115 and 116 toward the plane and with the inner ends of the third portions 117 and 118 and the inner ends of the fourth portions 119 and 120 being secured to the probe assembly.

As illustrated, portions 121 and 122 are turned inwardly from the inner ends of the third portions 117 and 118 to be disposed between the blocks 95 and 96 and the plates 99 and 100, while portions 123 and 124 are turned inwardly from the inner ends of the fourth portions 119 and 120, to be disposed between the block at 104 and the plates 99 and 100.

As also illustrated, each of the leaf spring means 109 and 110 is formed from two separate members which are overlapped, and screws 125 and 126 are provided for securing the overlapped portions to a pair of blocks 127 and 128. The blocks 127 and 128 are secured to the base of the support member 90 by pairs of screws 129 and 130, which extend through pairs of slots 131 and 132 in the blocks 127 and 128, to permit adjustment of the position of the leaf spring means 109 and 110 in a direction parallel to the plane of symmetry, and to thereby permit adjustment of the pressure of the engagement with the wire 11.

The illustrated leaf spring support arrangement is highly advantageous in that it permits movement of the block 86 in a direction parallel to the plane of symmetry and also in a direction transverse thereto, to accommodate eccentricities in the location of the wire 11 with respect to the axis of rotation of the support member 90. At the same time, however, the arrangement does not permit substantial displacement of the block 86 in an axial direction, and the axis of the probe 85 can be maintained uniformly perpendicular to the surface of the wire, so that highly uniform test results are obtained.

A further important feature of the modified construction 84 is in the provision of a control means generally designated by reference numeral 134 which has no effect on the operation of the probe means during operation of the unit, but which automatically moves the block 86 away from the wire 11 when the unit is inoperative, so as to permit insertion of the wire 11 into the unit.

In accordance with this feature, an L-shaped bracket 135 is provided having one leg 136 secured to the support member 90 and having a second leg 137 which defines a surface facing radially inwardly toward the probe assembly. A pin 138 extends radially inwardly from the leg 137, an externally threaded portion 139 at the base of the pin 138 being threaded into an internally threaded opening of the leg 137, and a screwhead 140 being formed at the outer end of the pin 138. A generally cup-shaped weight member 141 is disposed on the pin 138 and a coiled compression spring 142 is provided within the weight member 141 and about the pin 138 for urging the weight member 141 radially inwardly. The weight member is illustrated in its operative position in which centrifugal force holds it outwardly against the inwardly-facing surface of the leg 137, against the action of the spring 142. When the device is in a non-rotating condition, however, the compression spring 142 urges the weight member 141 inwardly to engage the member 106 of the probe assembly, and to move the block 86 away from the wire 11.

Thus the block 86 is automatically moved away from the wire 11 when the support member 90 is not rotating, but the probe assembly is not moved radially in response to centrifugal force, and sharp impacts and non-uniformities in the test results are avoided.

It may be noted that with the control means 134 of the modified construction 84, it is not necessary to provide cam surfaces adjacent to the face portions engaged with the wire 11 and the wear shoes 87a and 88a, as illustrated, do not have inclined portions corresponding with those of the wear shoes 14a and 15a of the unit 10.

It fill be understood that modifications and variations may be effected without departing from the spirit and scope of the novel concepts of this invention.

We claim as our invention:

1. In apparatus for testing an elongated cylindrical object, a support journaled for rotation about a certain axis and having an opening about said axis for passage of said cylindrical object generally coaxially therethrough, probe means having a sensing face portion for engaging said objects and having portions on opposite sides of said axis such as to provide a substantial balance with respect to centrifugal forces acting thereon, first spring means acting between said probe means and said support for urging said sensing face portion toward said axis, and control means engageable with said probe means and including second spring means exerting a force in a direction to move said sensing face portion radially outwardly against the action of said first spring means to permit insertion of said elongated cylindrical object into said opening, said control means further including weight means operable by centrifugal force against the force of said second spring means to disengage said control means from said probe means and to permit said first spring means to urge said sensing face portion toward said axis.

2. In apparatus for testing an elongated cylindrical object, a support journaled for rotation about a certain axis and having an opening about said axis for passage of said cylindrical object generally coaxially therethrough, probe means having a sensing face portion for engaging said objects and having portions on opposite sides of said axis such as to provide a substantial balance with respect to centrifugal forces acting thereon, spring means acting between said probe means and said support for urging said sensing face portion toward said axis, means on said support defining a surface facing radially inwardly toward said probe means, a pin extending radially inwardly from said surface, a cup-shaped weight member on said pin, and a coiled compression spring within said weight member and about said pin for urging said weight member radially inwardly into engagement with said probe means to move said sensing face portion radially outwardly against the action of said spring means, said weight member being movable radially outwardly by centrifugal force against the action of said coiled compression spring out of engagement with said probe means.

3. In apparatus for testing an elongated cylindrical object, a support journaled for rotation about a certain axis and having an opening about said axis for passage of said cylindrical object generally coaxially therethrough, probe means in generally surrounding relation to said object and having a sensing face portion for engaging said object, and first and second leaf spring means symmetrically located with respect to a plane of symmetry through said axis and each being affixed to said support at a point outside said probe means and each having first and second portions extending in opposite directions from said point in parallel relation to said plane and third and fourth portions extending from said first and second portions toward said plane with inner ends of said third and fourth portions being secured to said probe means.

4. In apparatus as defined in claim 3, said probe means having a weight distribution such as to provide a substantial balance with respect to centrifugal forces acting thereon, and said leaf spring means being effective to urge said sensing face portion into engagement with said object.

5. In apparatus as defined in claim 3, said probe means having a second face portion for engagement with a point on said object spaced approximately ninety degrees from the point engaged by said sensing face portion.

6. In apparatus for testing an elongated cylindrical object, a support journalled for rotation about a certain axis and having an opening about said axis for passage of said cylindrical object generally coaxially therethrough, probe means having first and second face portions for engagement with surface portions of said object having an angular spacing on the order of 90 degrees, first spring means acting on said probe means to urge said first and second face portions to positions on opposite sides of and at equal distances from a first plane intersecting said axis and operative to urge said first and second plane face portions toward a second plane intersecting said axis and at 90 degrees to said first plane, said probe means including portions on opposite sides of said first plane and portions on opposite sides of said second plane such as to provide a substantial balance with respect to centrifugal forces, whereby the pressure between said sensing face portions and said object is determined solely by said spring means and is not affected by centrifugal force, and control means engageable with said probe means and including second spring means exerting a force in a direction to move said sensing face portion away from said second plane against the action of said first spring means to permit insertion of said elongated cylindrical object into said opening, said control means further including weight means operable by centrifugal force against the force of said second spring means to disengage said control means from said probe means and to permit said first spring means to urge said sensing face portions toward said second plane.

References Cited
UNITED STATES PATENTS

| | | | |
|---|---|---|---|
| 2,878,447 | 3/1959 | Price et al. | 324—37 |
| 2,998,566 | 8/1961 | Cochran | 324—37 |
| 3,025,460 | 3/1962 | Callan et al. | 324—37 |
| 3,066,254 | 11/1962 | Price et al. | 324—37 |
| 3,202,914 | 8/1965 | Deem et al. | 324—40 |

RUDOLPH V. ROLINEC, *Primary Examiner.*

WALTER L. CARLSON, *Examiner.*

R. B. WILKINSON, R. J. CORCORAN,
*Assistant Examiners.*